June 4, 1929. H. P. SPARKES 1,716,246

METER TESTING BLOCK

Filed April 15, 1926

WITNESSES:
L. J. Dean
A. H. Pendleton

INVENTOR
Harry P. Sparkes
BY
J. H. Procter
ATTORNEY

Patented June 4, 1929.

1,716,246

UNITED STATES PATENT OFFICE.

HARRY P. SPARKES, OF PITTSBURGH, PENNSYLVANIA, ASSIGNOR TO THE SUPERIOR SWITCHBOARD & DEVICES COMPANY, A CORPORATION OF OHIO.

METER-TESTING BLOCK.

Application filed April 15, 1926. Serial No. 102,207.

My invention relates to watt-hour meter testing devices and particularly to universal testing blocks.

One object of my invention is to provide a testing device that shall be suitable for all types of watt-hour meters.

Another object of my invention is to provide a testing block having terminals therein that are adapted to assume any desired positions to effectively register with any type of watt-hour meter.

A further object of my invention is to provide a testing device, of the above indicated character, that shall be simple and inexpensive to construct and effective in its operation.

In practicing my invention, I provide a base block having four longitudinally movable terminals extending through the bottom thereof, a corresponding number of universally movable terminals are disposed in the upper part of the block and corresponding terminals are resiliently and electrically connected. A number of cap blocks having openings therein that are spaced to correspond to the spacing of the terminal openings of the meters to be tested. The cap block is secured to the base block and the upper terminals extend through the opening. When it is desired to test a meter, it is placed in such position that the upper terminals extend into the terminal openings of the meter and effectively engage the terminals therein. The lower terminals are connected to the source of power, testing instruments and a loading device to thereby facilitate testing the meter.

If other types of meters are to be tested, it is only necessary to provide a cap block having the proper spaced openings therein, to properly position the upper terminals.

Figure 2:
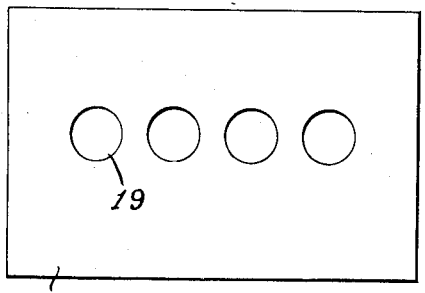
Figure 3:
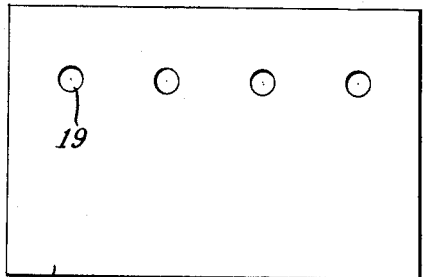
Figure 1:
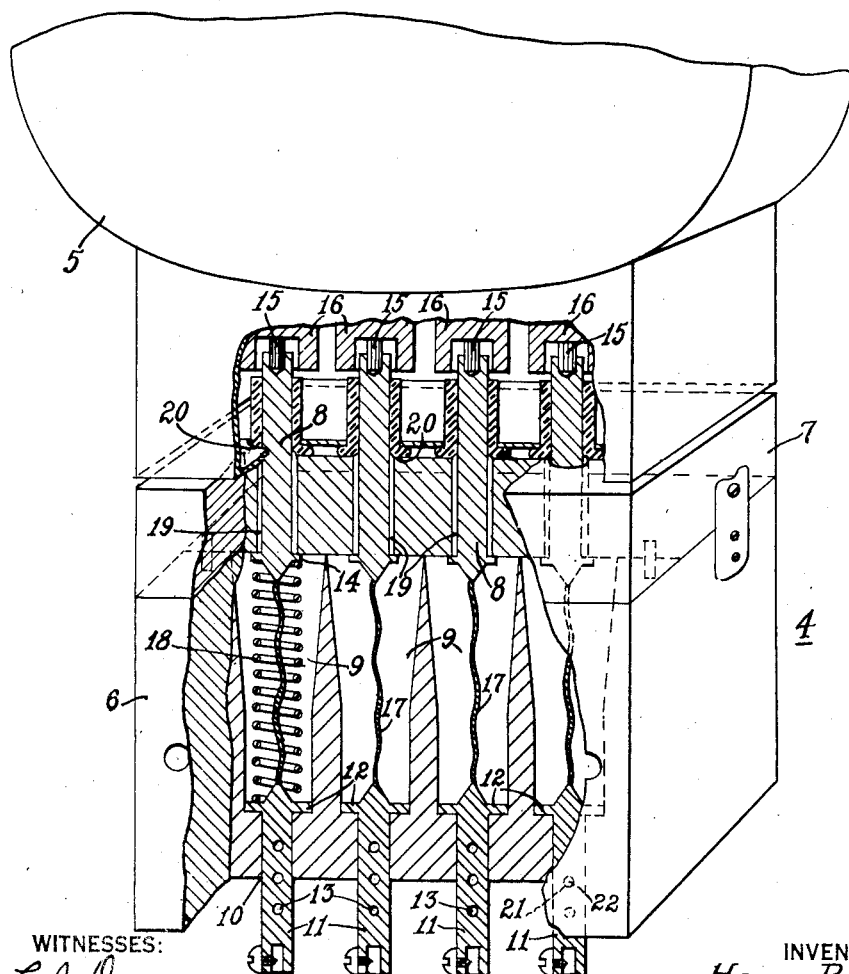

In the accompanying drawing, Fig. 1 is a view partly in perspective and partly in section of a testing device operatively connected to a watt-hour meter, and Figs. 2 and 3 are top plan views of cap blocks embodying my invention.

A testing device 4, for a watt-hour meter 5, comprises, in general, a base block 6, a top or cap block 7, and universally movable terminal members 8.

The base block 6 is divided into four compartments 9, each of which has an opening 10 in the bottom thereof. Terminal members 11 are slidably mounted in the openings 10 and they have enlarged heads 12 and a number of openings 13 therein. The openings 13 are adapted to register with an opening 21 in the base block to receive a pin 22 and thus retain the terminals 11 in any one of these positions.

The terminals 8 are similar to the terminals 11, in that they are also provided with an enlarged lower head 14. They are also each provided with a gauze tip 15 to effect good electrical engagement with the terminals 16 of the meter 5. Flexible conductors 17 connect the corresponding terminals 8 and 11 and springs 18 are also disposed between the heads 12 and 14 of the corresponding terminals.

The cap blocks 7 are provided with openings 19, the spacing of which corresponds to the spacings of the terminal openings 20 in the meter to be tested. It will be noted the openings may be of any spacing as shown in the various cap blocks shown in Figs. 2 and 3. The upper terminals 8 register with the openings 20 and are so positioned that when the meter 5, corresponding to the particular cap blocks 7 used is placed in position and the proper circuits, instruments and load connected to the terminals 11, the meter may be tested without difficulty.

When a different type of watt-hour meter is tested, it is only necessary to use a cap block, having openings therein, corresponding in their spacings to the spacings of the terminal openings of the meter to be tested. It will be observed that since the terminals 8 are universally movable, they may register with the openings in any type of cap block.

The position of the terminals 11, will, of course, control the tension of the springs 18 and this is accomplished by inserting a pin 22 in the opening 21 in the base block 6, which registers with one of the openings 13 in the terminal.

Many changes may be made in my invention and it may be variously modified within the spirit and scope thereof as set forth in the appended claims.

I claim as my invention:

1. A testing device for watt-hour meters comprising a base block, a plurality of terminals extending through the bottom thereof, a plurality of terminals in the upper part thereof, resilient means between the corresponding terminals, and a cap block having openings therein through which loosely extend the terminals in the upper part of the base block, said openings in the cap block being spaced similarly to the openings in the meter to be tested.

2. A testing device for watt-hour meters comprising a base block, a plurality of longitudinally movable terminals extending through the bottom thereof, corresponding longitudinally and laterally movable terminals in the upper part thereof, resilient means disposed between cooperating terminals, and a cap block having openings therein to receive the upper terminals.

3. A testing device for watt-hour meters comprising a base block, a plurality of longitudinally movable terminals extending through the bottom thereof, corresponding longitudinally and laterally movable terminals in the upper part thereof, resilient means disposed between cooperating terminals, and a removable cap block having openings therein to receive the upper terminals and to permit longitudinal movement of the same therein.

4. A testing device for watt-hour meters comprising a base block, a plurality of longitudinally movable terminals extending through the bottom thereof, corresponding longitudinally and laterally movable terminals in the upper part thereof, resilient means disposed between cooperating terminals, and a removable cap block having openings therein to receive the upper terminals and to permit longitudinal movement of the same therein, said openings in the cap block corresponding to the terminal openings in the meter to be tested.

5. A universal testing device for watt-hour meters comprising a base block having a plurality of compartments therein, resiliently mounted and longitudinally and laterally movable terminal members disposed in said compartments and adapted to register with the terminal openings of the meter to be tested and means for positioning the terminal members.

6. A universal testing device for watt-hour meters comprising a base block, longitudinally movable terminals in the bottom thereof, corresponding universally movable terminals in the upper part thereof for registering with the terminal openings in the meter to be tested, means for electrically and resiliently connecting the corresponding terminals and means for securing the lower terminals in any desired position.

In testimony whereof, I have hereunto subscribed my name this 7th day of April, 1926.

HARRY P. SPARKES.